United States Patent [19]

Ishii

[11] Patent Number: 5,435,454
[45] Date of Patent: Jul. 25, 1995

[54] OIL RESERVOIR CAP WITH CONCENTRIC BAFFLES

[75] Inventor: Shinichi Ishii, Atsugi, Japan

[73] Assignee: Unisia Jecs Corporation, Atsugi, Japan

[21] Appl. No.: 195,819

[22] Filed: Feb. 14, 1994

[30] Foreign Application Priority Data

Feb. 26, 1993 [JP] Japan .................. 5-013090 U

[51] Int. Cl.⁶ .................................... B65D 51/16
[52] U.S. Cl. ...................... 220/374; 220/86.2
[58] Field of Search .......... 220/366, 374, 373, 86.2, 220/DIG. 32, DIG. 33

[56] References Cited

U.S. PATENT DOCUMENTS

| | | | |
|---|---|---|---|
| 1,689,641 | 10/1928 | Pickles | 220/366 |
| 3,961,724 | 6/1976 | Kapsy | 220/374 |
| 3,966,078 | 6/1976 | Johnson et al. | 220/374 |
| 4,036,393 | 7/1977 | Neiman | 220/374 X |
| 4,512,499 | 4/1985 | Uuskallio | 220/394 |
| 4,524,881 | 6/1985 | Mierzwa | 220/374 |
| 4,572,394 | 2/1986 | Tanakashi et al. | 220/86.2 |
| 4,690,293 | 9/1987 | Uranishi et al. | 220/86.2 |
| 4,971,219 | 11/1990 | Dombeck et al. | 220/366 |
| 5,024,345 | 6/1991 | Deweerdt | 220/366 |
| 5,152,419 | 10/1992 | Vanagi | 220/374 |
| 5,269,431 | 12/1993 | Sakata et al. | 220/374 |

FOREIGN PATENT DOCUMENTS 6119101 4/1986 Japan .

*Primary Examiner*—Allan N. Shoap
*Assistant Examiner*—Robin A. Hylton
*Attorney, Agent, or Firm*—Bachman & LaPointe

[57] ABSTRACT

A cap for a reservoir comprises cylindrical baffles with different diameters concentrically arranged in the cap, and breathers arranged to the cylindrical baffles.

1 Claim, 2 Drawing Sheets

OIL RESERVOIR CAP WITH CONCENTRIC BAFFLES

BACKGROUND OF THE INVENTION

The present invention relates to a cap for an oil reservoir.

Conventionally, an oil reservoir mounted on a motor vehicle, etc. is provided with a filler port for oil feeding, which is closed by a detachable cap.

In order to prevent a leakage of oil received in the reservoir out of the filler port, and a rise in pressure therein due to vibrations during cruising of the motor vehicle, a cap as shown in FIG. 3 is proposed which is provided with a baffle board "a" and a breather "b". This cap comprises four component parts: a body cap "c", a cover cap "d", a packing "e" for preventing an oil leakage, and a spring plate "f" for tightening the cap. Additionally, in order to prevent an oil leakage out of the filler port and a rise in pressure in the reservoir, an oil reservoir as disclosed in JP-U 61-19101 is proposed.

With the cap as shown in FIG. 3, however, due to simple construction of the baffle board "a" and the breather "b", an oil leakage out of the filler port and a rise in pressure in the reservoir cannot be prevented surely. Further, due to the large number of the component parts (i.e., the cap comprises four component parts as described above), the cap needs a large number of manufacturing and assembling processes, resulting in a cost up. Furthermore, since the cover cap "d" should be press-fitted after assembling the spring plate "f" to the body cap "c", and setting the packing "e", the cap is not excellent in assembling performance.

Additionally, the oil reservoir as disclosed in JP-U 61-19101 has inconveniences such as the large number of manufacturing processes and a bad cost performance due to complicated construction.

It is, therefore, an object of the present invention to provide a cap for an oil reservoir which enables, with easy manufacturing and assembling, a sure prevention of an oil leakage and a rise in pressure in the oil reservoir.

SUMMARY OF THE INVENTION

According to one aspect of the present invention, there is provided a cap for a reservoir, the cap being detachably mounted to a filler port of tile reservoir, comprising:
  a plurality of baffles concentrically arranged in the cap, said plurality of baffles having different diameters; and
  breather means for allowing air communication of the reservoir with the atmosphere.

According to another aspect of the present invention, there is provided a reservoir for a motor vehicle, comprising:
  a main body having a filler port;
  a cap detachably mounted to said filler port;
  a first baffle arranged in said filler port;
  a plurality of second baffles concentrically arranged in said cap, said plurality of second baffles having different diameters; and
  breather means for allowing air communication of the reservoir with the atmosphere.

DETAILED DESCRIPTION OF THE INVENTION

Figure 1:
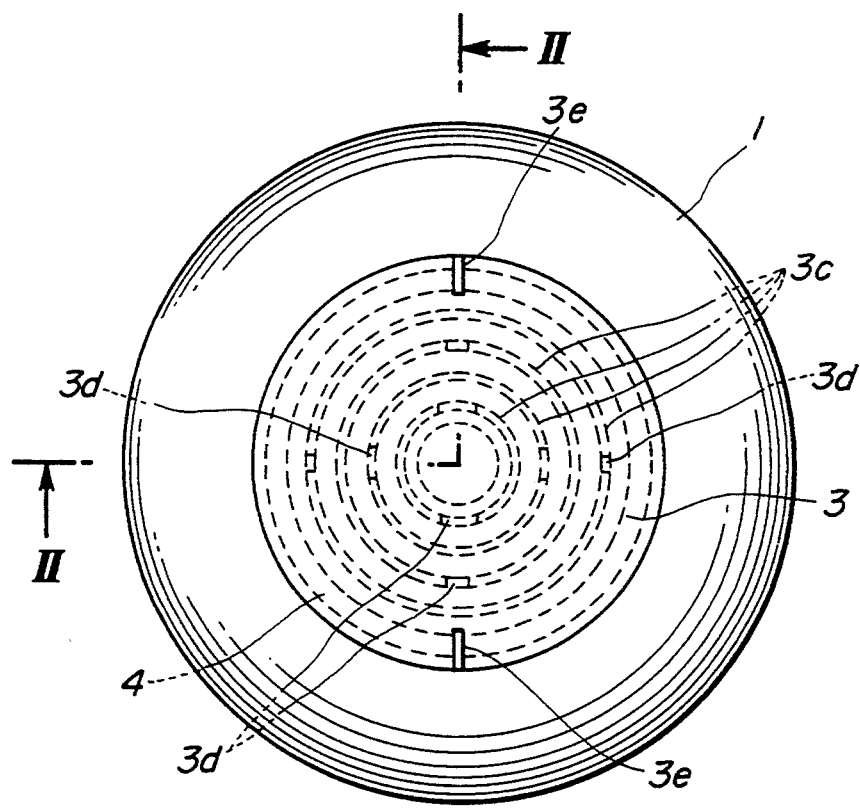
FIG. 1 is a plan view showing a preferred embodiment of a cap for an oil reservoir according to the present invention.
Figure 2:
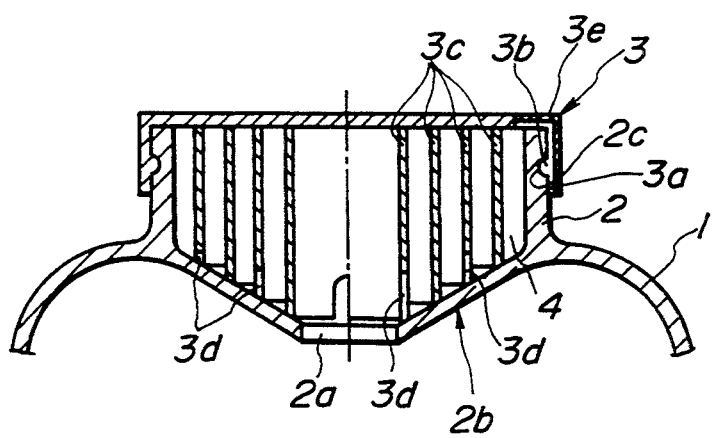
FIG. 2 is a longitudinal section taken along the line II—II in FIG. 1.
Figure 3:
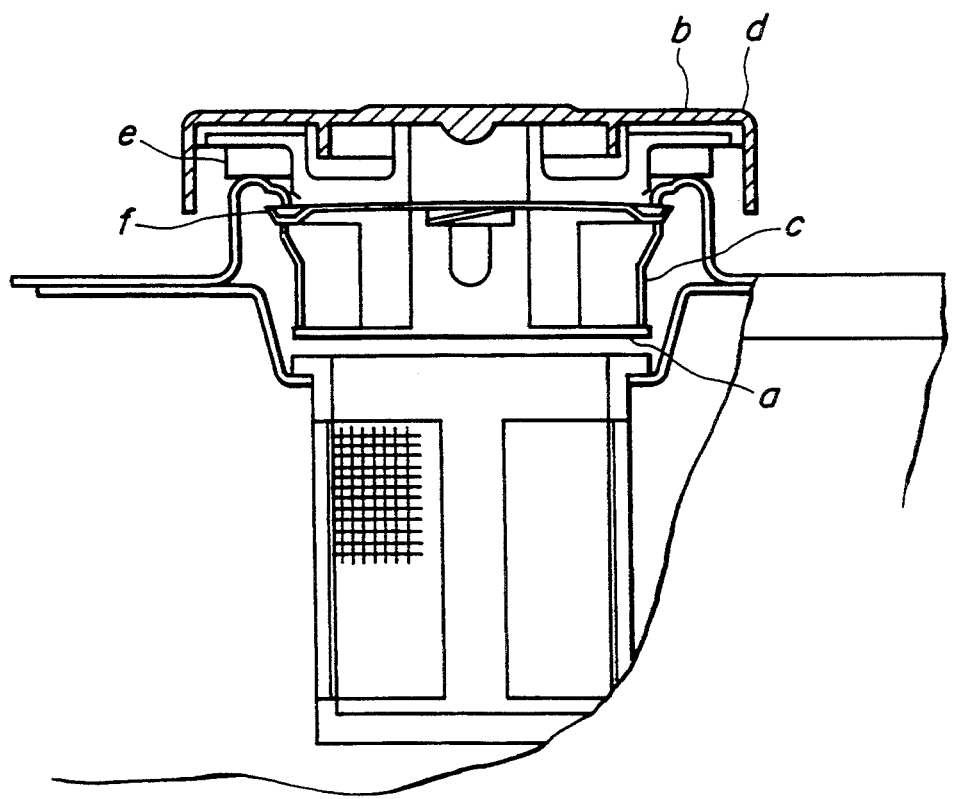
FIG. 3 is a view similar to FIG. 2, showing a known cap for an oil reservoir.

Referring to FIGS. 1 and 2, there is shown a preferred embodiment of the present invention wherein a tank designated generally by reference numeral 1 includes a filler port 2, and a cap main body 3 for closing the filler port 2.

A funnel-like baffle 2b having an opening 2a is formed inside the filler port 2. Cylindrical baffles 3c, as will be described later, protrusively arranged inside the cap main body 3 have an end which abuts on an upper side of the baffle 2b, respectively.

The cap main body 3 is made of synthetic resin, and has a cylindrical portion 3a with an inner peripheral surface on which a protrusion 3b is protrusively arranged to engage with engagement grooves 2c formed on an outer peripheral surface of the filler port 2, through the protrusion 3b the cap main body 3 being secured to an opening of the filler port 2 in the tightened state. The aforementioned cylindrical baffles 3c are protrusively arranged on an inner surface of the cap main body 3.

The cylindrical baffles 3c are such that a plurality of cylindrical bodies with different diameters are concentrically arranged, and are formed to decrease the length with an increase in diameter (It is to be understood that the cylindrical baffle 3c with the minimum diameter is the longest) so as to have ends which abut on a taper-like upper side of the baffle 2b. Additionally, slit-like breathers 3d are formed at ends of the cylindrical baffles 3c so as to be substantially 90° offset with each other.

An annular space 4 formed between the outermost cylindrical baffle 3c and an inner wall of the filler port 2 communicates with atmosphere through a breather hole 3e formed in an upper side of the cap main body 3.

Next, an operation of this embodiment will be described. Even if due to vibrations of the tank 1 during cruising of the motor vehicle, oil received therein is splashed up to reach the cap main body 3 through the opening 2a of the baffle 2b, oil is obstructed by the cylindrical baffles 3c as protrusively arranged to the cap main body 3, and fails to leak out of the filler port 2, resulting in a high sealing performance. Moreover, oil splashed up in the cap main body 3 drops in the tank 1 through the opening 2a due to an inclination of the baffle 2b, resulting in no oil stay in the cap main body 3.

On the other hand, even with a change in pressure in the tank 1 due to temperature variations, etc., air within the tank 1 is released or atmosphere is introduced therein through the breathers 3d arranged at the ends of the cylindrical baffles 3c in an offset way and the breather hole 3e of the cap main body 3, resulting in a prevention of pressure variations in the tank 1.

Having described the present invention in connection with the preferred embodiment, it is to be noted that the present invention is not limited thereto, and various changes and modifications are possible without departing from the spirit of the present invention.

What is claimed is:

1. A reservoir for a motor vehicle, comprising:

a main body having a filler port;

a cap detachably mounted to said filler port;

a first baffle arranged in said filler port, said first baffle being in the form of a funnel;

a plurality of second baffles concentrically arranged in said cap, said plurality of second baffles having different diameters, said plurality of second baffles being in the form of a cylinder, said plurality of second baffles being arranged to abut on said first baffle; and breather means for allowing air communication of the reservoir with the atmosphere.

* * * * *